(12) United States Patent
Elwart et al.

(10) Patent No.: US 9,042,603 B2
(45) Date of Patent: May 26, 2015

(54) METHOD AND APPARATUS FOR ESTIMATING THE DISTANCE FROM TRAILER AXLE TO TONGUE

(71) Applicant: Ford Global Technologies, LLC, Dearborn, MI (US)

(72) Inventors: Shane Elwart, Ypsilanti, MI (US); John Shutko, Ann Arbor, MI (US); Kenneth Michael Mayer, Ypsilanti, MI (US); Roger Arnold Trombley, Ann Arbor, MI (US); Christopher Nave, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 13/775,548

(22) Filed: Feb. 25, 2013

(65) Prior Publication Data

US 2014/0241584 A1    Aug. 28, 2014

(51) Int. Cl.
G06K 9/00    (2006.01)
G06K 9/32    (2006.01)

(52) U.S. Cl.
CPC .......... *G06K 9/00791* (2013.01); *G06K 9/3258* (2013.01)

(58) Field of Classification Search
None
See application file for complete search history.

(56) References Cited

U.S. PATENT DOCUMENTS

| | | | |
|---|---|---|---|
| 4,727,419 A | * | 2/1988 | Yamada et al. ............... 382/141 |
| 4,778,060 A | * | 10/1988 | Wessner, Jr. ................... 209/3.3 |
| 5,455,557 A | | 10/1995 | Noll et al. |
| 5,523,947 A | | 6/1996 | Breen |
| 6,292,094 B1 | | 9/2001 | Deng et al. |
| 6,301,548 B1 | | 10/2001 | Gerum |
| 6,366,202 B1 | | 4/2002 | Rosenthal |
| 6,526,335 B1 | | 2/2003 | Treyz et al. |

(Continued)

FOREIGN PATENT DOCUMENTS

| | | |
|---|---|---|
| DE | 3931518 A1 | 4/1991 |
| DE | 9208595 U1 | 8/1992 |

(Continued)

OTHER PUBLICATIONS

Automatic Vehicle Classification Using Learning-based Computer Vision and Fuzzy Logic; Jailson A de Brito Jr., Departamento de Ciencia da Computacao, Instituto de Matematics, Universidade Federal da Bahia; Luis Edmundo Prado de Campos, Laboratorio de Geotencnia—DCTM, Escola Plitecnica, Universidde Federal da Bahia.*

(Continued)

*Primary Examiner* — Bernard Krasnic
*Assistant Examiner* — Pinalben Patel
(74) *Attorney, Agent, or Firm* — Raymond Coppiellie; Price Heneveld LLP

(57) ABSTRACT

A system includes a processor configured to receive a trailer image. The processor is also configured to identify an axle in the trailer image and identify a tongue-end in the trailer image. Further, the processor is configured to receive a tire image, including a wheel diameter provided on a tire. The processor is additionally configured to retrieve the wheel diameter from the tire image. The processor is also configured to identify a wheel, having an indentified diameter corresponding to the wheel diameter, in the first image. Additionally, the processor is configured to calculate a distance from the axle to the tongue-end using the identified diameter.

14 Claims, 4 Drawing Sheets

(56) References Cited

U.S. PATENT DOCUMENTS

| | | |
|---|---|---|
| 6,573,833 B1 | 6/2003 | Rosenthal |
| 6,806,809 B2 | 10/2004 | Lee et al. |
| 6,959,970 B2 | 11/2005 | Tseng |
| 6,999,856 B2 | 2/2006 | Lee et al. |
| 7,047,117 B2 | 5/2006 | Akiyama et al. |
| 7,207,041 B2 | 4/2007 | Elson et al. |
| 7,266,435 B2 | 9/2007 | Wang et al. |
| 7,447,585 B2 | 11/2008 | Tandy, Jr. et al. |
| 7,505,784 B2 | 3/2009 | Barbera |
| 7,602,782 B2 | 10/2009 | Doviak et al. |
| 7,798,263 B2 | 9/2010 | Tandy, Jr. et al. |
| 7,801,941 B2 | 9/2010 | Conneely et al. |
| 7,904,222 B2 | 3/2011 | Lee et al. |
| 8,073,594 B2 | 12/2011 | Lee et al. |
| 8,121,802 B2 | 2/2012 | Grider et al. |
| 8,131,458 B1 | 3/2012 | Zilka |
| 8,190,364 B2 | 5/2012 | Rekow |
| 8,498,757 B2 | 7/2013 | Bowden et al. |
| 8,547,401 B2 * | 10/2013 | Mallinson et al. ............ 345/633 |
| 8,571,777 B2 | 10/2013 | Greene |
| 8,675,953 B1 * | 3/2014 | Elwell et al. ................. 382/154 |
| 8,755,984 B2 | 6/2014 | Rupp et al. |
| 8,811,698 B2 * | 8/2014 | Kono et al. .................. 382/128 |
| 2002/0098853 A1 | 7/2002 | Chrumka |
| 2003/0079123 A1 | 4/2003 | Mas Ribes |
| 2003/0147534 A1 | 8/2003 | Ablay et al. |
| 2004/0203660 A1 | 10/2004 | Tibrewal et al. |
| 2004/0260438 A1 | 12/2004 | Chemetsky et al. |
| 2004/0267585 A1 | 12/2004 | Anderson et al. |
| 2005/0074143 A1 * | 4/2005 | Kawai .......................... 382/104 |
| 2005/0091408 A1 | 4/2005 | Parupudi et al. |
| 2005/0177635 A1 | 8/2005 | Schmidt et al. |
| 2006/0150197 A1 | 7/2006 | Werner |
| 2006/0156315 A1 | 7/2006 | Wood et al. |
| 2006/0190097 A1 | 8/2006 | Rubenstein |
| 2006/0244579 A1 | 11/2006 | Raab |
| 2006/0287787 A1 | 12/2006 | Engstrom et al. |
| 2006/0287821 A1 | 12/2006 | Lin |
| 2007/0016362 A1 | 1/2007 | Nelson |
| 2007/0042809 A1 | 2/2007 | Angelhag |
| 2007/0042812 A1 | 2/2007 | Basir |
| 2007/0050854 A1 | 3/2007 | Cooperstein et al. |
| 2007/0132572 A1 | 6/2007 | Itoh et al. |
| 2007/0294625 A1 | 12/2007 | Rasin et al. |
| 2008/0086455 A1 | 4/2008 | Meisels et al. |
| 2008/0148374 A1 | 6/2008 | Spaur et al. |
| 2008/0220718 A1 | 9/2008 | Sakamoto et al. |
| 2008/0231701 A1 | 9/2008 | Greenwood et al. |
| 2008/0313050 A1 | 12/2008 | Basir |
| 2009/0005932 A1 | 1/2009 | Lee et al. |
| 2009/0010448 A1 | 1/2009 | Voto et al. |
| 2009/0075624 A1 | 3/2009 | Cox et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0156182 A1 | 6/2009 | Jenkins et al. |
| 2009/0228908 A1 | 9/2009 | Margis et al. |
| 2009/0253466 A1 | 10/2009 | Saito et al. |
| 2009/0280859 A1 * | 11/2009 | Bergh ........................ 455/556.1 |
| 2009/0318119 A1 | 12/2009 | Basir |
| 2010/0063670 A1 | 3/2010 | Brzezinski et al. |
| 2010/0094996 A1 | 4/2010 | Samaha |
| 2010/0098853 A1 | 4/2010 | Hoffmann et al. |
| 2010/0157061 A1 | 6/2010 | Katsman et al. |
| 2010/0216509 A1 | 8/2010 | Riemer et al. |
| 2010/0234071 A1 | 9/2010 | Shabtay et al. |
| 2010/0272370 A1 * | 10/2010 | Schilling et al. ............. 382/199 |
| 2010/0306309 A1 | 12/2010 | Santori et al. |
| 2010/0324770 A1 * | 12/2010 | Ramsey et al. ................. 701/25 |
| 2011/0087385 A1 | 4/2011 | Bowden et al. |
| 2011/0105097 A1 | 5/2011 | Tadayon et al. |
| 2011/0110530 A1 | 5/2011 | Kimura |
| 2011/0112762 A1 | 5/2011 | Gruijters et al. |
| 2011/0125457 A1 | 5/2011 | Lee et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0275358 A1 | 11/2011 | Faenger |
| 2011/0296037 A1 | 12/2011 | Westra et al. |
| 2012/0054300 A1 | 3/2012 | Marchwicki et al. |
| 2012/0064917 A1 | 3/2012 | Jenkins et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0200706 A1 | 8/2012 | Greenwood et al. |
| 2013/0158863 A1 | 6/2013 | Skvarce et al. |
| 2013/0268160 A1 | 10/2013 | Trombley et al. |
| 2013/0321347 A1 * | 12/2013 | Kim ............................. 345/175 |
| 2014/0005918 A1 | 1/2014 | Qiang |
| 2014/0012465 A1 * | 1/2014 | Shank et al. .................... 701/36 |
| 2014/0058655 A1 * | 2/2014 | Trombley et al. ............. 701/300 |
| 2014/0085472 A1 | 3/2014 | Lu et al. |
| 2014/0172232 A1 | 6/2014 | Rupp et al. |

FOREIGN PATENT DOCUMENTS

| | | |
|---|---|---|
| DE | 10154612 A1 | 5/2003 |
| DE | 102005042957 A1 | 3/2007 |
| DE | 102006002294 A1 | 7/2007 |
| DE | 102006035021 | 4/2010 |
| DE | 102008043675 A1 | 5/2010 |
| DE | 102009007990 A1 | 8/2010 |
| DE | 102011108440 A1 | 1/2013 |
| DE | 102012006206 A1 | 10/2013 |
| EP | 0418653 A1 | 3/1991 |
| EP | 1593552 B2 | 3/2007 |
| EP | 1810913 A1 | 7/2007 |
| EP | 2487454 A2 | 8/2012 |
| EP | 2551132 A1 | 1/2013 |
| WO | 2012059207 A1 | 5/2012 |
| WO | 2014019730 A1 | 2/2014 |

OTHER PUBLICATIONS

Recognizing Cars: Louka Dlagnekov, Sege Belongie, Department of Comptuer Science and Engineering, University of California, San Diego, CA.*

Service and User Interface Transfer from Nomadic Devices to Car Infotainment Systems: Jan Sonnenberg, Technische Universitat Braunschweig, Proceedings of Second International Conference on Automotive User Interface and Itneractive Vehicular Applications Nov. 2010, Pittsburg, PA, USA.*

Vehicle Dimensions Estimation Scheme Using AAM on Stereoscopic VIdeo: Robert Tarajczak, Tomasz Grajek, Chair of Multimedia Telecommunications and Microelectronics, Poznan University of Technology, Polanka 3 street, Poznan, Poland.*

Google Mapp Application: https://support.google.com/maps/answer/1628031?hl=en.*

Iphotomeasure Software Application: http://gigaom.com/2007/02/06/how_to_measure_/.*

European Patent Office.

International Search Report for the corresponding PCT/US2010/37052.

Korean Intellectual.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

(56) References Cited

OTHER PUBLICATIONS

Service Discovery Protocol (SDP) Layer Tutorial, Palowireless Bluetooth Research Center, http://www.palowireless.com/infotooth/tutorial/sdp.asp. Aug. 3, 2010.
IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.
Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.
Wikipedia, the free encyclopedia, X Window System, http://en.wikipedia.org/wiki/X_Window_System, Jun. 22, 2010.
Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.
"MobileSafer is your personal safe driving assistant", 2010 ZoomSafer Inc. <http://zoomsafer.com/products/mobilesafer> Dec. 28, 2010.
"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.
"PhonEnforcer FAQ's" Turn Off the Cellphone While Driving—PhonEnforcer. Turn Off the Cell Phone LLC. <http://turnoffthecellphone.com/faq.html> Dec. 28, 2010, pp. 1-2.
Lamberti, Ralph "Daimler Full Circle: The Rise of Vehicle-Installed Telematics—Telematics Munich 2009" Nov. 10, 2009.v.
Narasimhan, et al., A lightweight remote display management protocol for mobile devices, Application Research Center, Motorola Labs Schaumburg, IL, 2007, pp. 711-715.
Voelcker, Top 10 Tech Cars It's the Environment, Stupid, www.Spectrum.IEEE.Org, Apr. 2008, pp. 26-35.
Yarden, et al., TUKI: A Voice-Activated Information Browser, IEEE, 2009, pp. 1-5.
Gil-Castineira, et al., Integration of Nomadic Devices with Automotive User Interfaces, IEEE Transactions on Consumer Electronics, vol. 55, No. 1, Feb. 2009.
Nusser, et al., Bluetooth-based Wireless Connectivity in an Automotive Environment, Robert Bosch GmbH, VTC 2000, pp. 1935-1942.
Antuan Goodwin, The Car Tech Blog, Ford Unveils open-source Sync developer platform, http://reviews.cnet.com/8301-13746_7-10385619-48.html, Oct. 2009, pp. 1-5.
Olof Enqvist, "AFS-Assisted Trailer Reversing," Institutionen för systemteknik Deartment of Electrical Engineering, Jan. 27, 2006, pp. 1-57.

* cited by examiner

METHOD AND APPARATUS FOR ESTIMATING THE DISTANCE FROM TRAILER AXLE TO TONGUE

TECHNICAL FIELD

The illustrative embodiments generally relate to a method and apparatus for estimating the distance from trailer axle to trailer tongue.

BACKGROUND

Whether moving, transporting items or transporting recreational vehicles, people often hook up trailers to a vehicle trailer hitch. These trailers come in all shapes and sizes, and vary in weight and handling capability. As vehicles now contain computerized systems and modules capable of modifying vehicle behavior, better control over an otherwise unwieldy trailer can be obtained if the vehicle knows certain features of the trailer.

For example, it may be useful to the vehicle if the trailer length from tongue-to-axle is known. Of course, that may require that an owner measure the distance using a tape measure, which may not be easily found or even owned. Further, it may not be clear to a trailer user from where the measurements are to be taken, which can result in confusion or an improper measurement.

SUMMARY

In a first illustrative embodiment, a system includes a processor configured to receive a trailer image. The processor is also configured to identify an axle in the trailer image and identify a tongue-end in the trailer image. Further, the processor is configured to receive a tire image, including a wheel diameter provided on a tire. The processor is additionally configured to retrieve the wheel diameter from the tire image. The processor is also configured to identify a wheel, having an indentified diameter corresponding to the wheel diameter, in the first image. Additionally, the processor is configured to calculate a distance from the axle to the tongue-end using the identified diameter.

In a second illustrative embodiment, a computer-implemented method includes receiving a trailer image. The method also includes identifying an axle in the trailer image and identifying a tongue-end in the trailer image. Further, the method includes receiving a tire image, including a wheel diameter provided on a tire. The method additionally includes retrieving the wheel diameter from the tire image. The method also includes identifying a wheel, having an indentified diameter corresponding to the wheel diameter, in the first image. Additionally, the method includes calculating a distance from the axle to the tongue-end using the identified diameter.

In a third illustrative embodiment, a non-transitory computer-readable storage medium stores instructions that, when executed by a processor, cause the processor to perform a method including receiving a trailer image. The method also includes identifying an axle in the trailer image and identifying a tongue-end in the trailer image. Further, the method includes receiving a tire image, including a wheel diameter provided on a tire. The method additionally includes retrieving the wheel diameter from the tire image. The method also includes identifying a wheel, having an indentified diameter corresponding to the wheel diameter, in the first image. Additionally, the method includes calculating a distance from the axle to the tongue-end using the identified diameter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
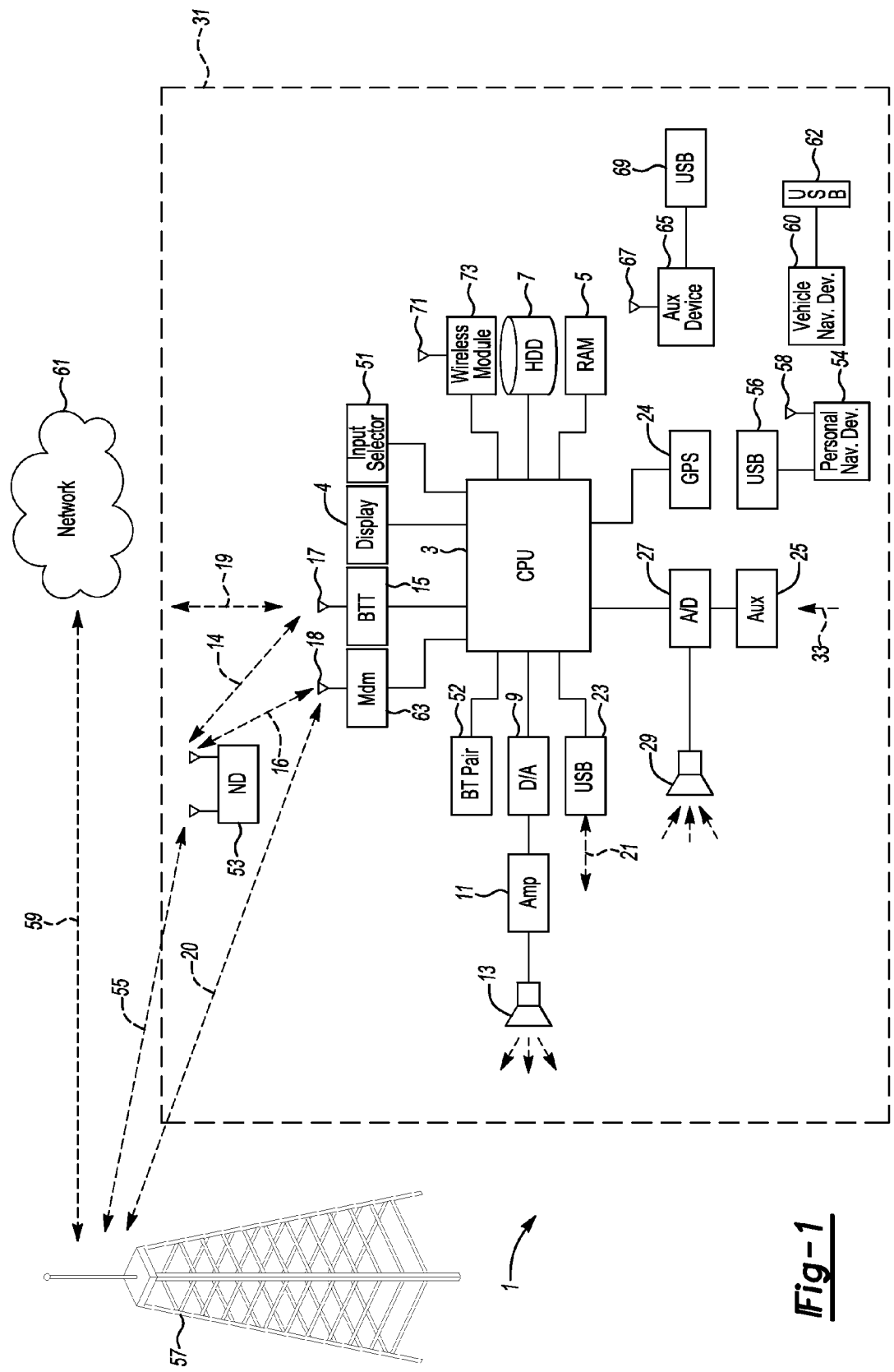
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9.

Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself One of ordinary skill in the art will understand when it is inappropriate to apply a particular VACS to a given solution. In all solutions, it is contemplated that at least the vehicle computing system (VCS) located within the vehicle itself is capable of performing the exemplary processes.

While trailer operators may not have access to or knowledge of how to properly utilize a tape measure to measure a trailer correctly, or how to successfully input the proper measurements to a vehicle, given the prevalence of phones equipped with cameras, it is reasonably likely that the operator has a camera phone available. Also, it is likely that the operator knows how to utilize the camera on the phone, as a stand alone application or in conjunction with an application provided in accordance with the illustrative embodiments.

By taking a picture of the trailer, an application designed to estimate a distance on the image can be provided with a picture usable for the appropriate estimation. Additionally, since a user may not be sure of a tire size, a suitably lit picture of a tire can provide the application with information usable to determine distances within the first picture.

Figure 2:
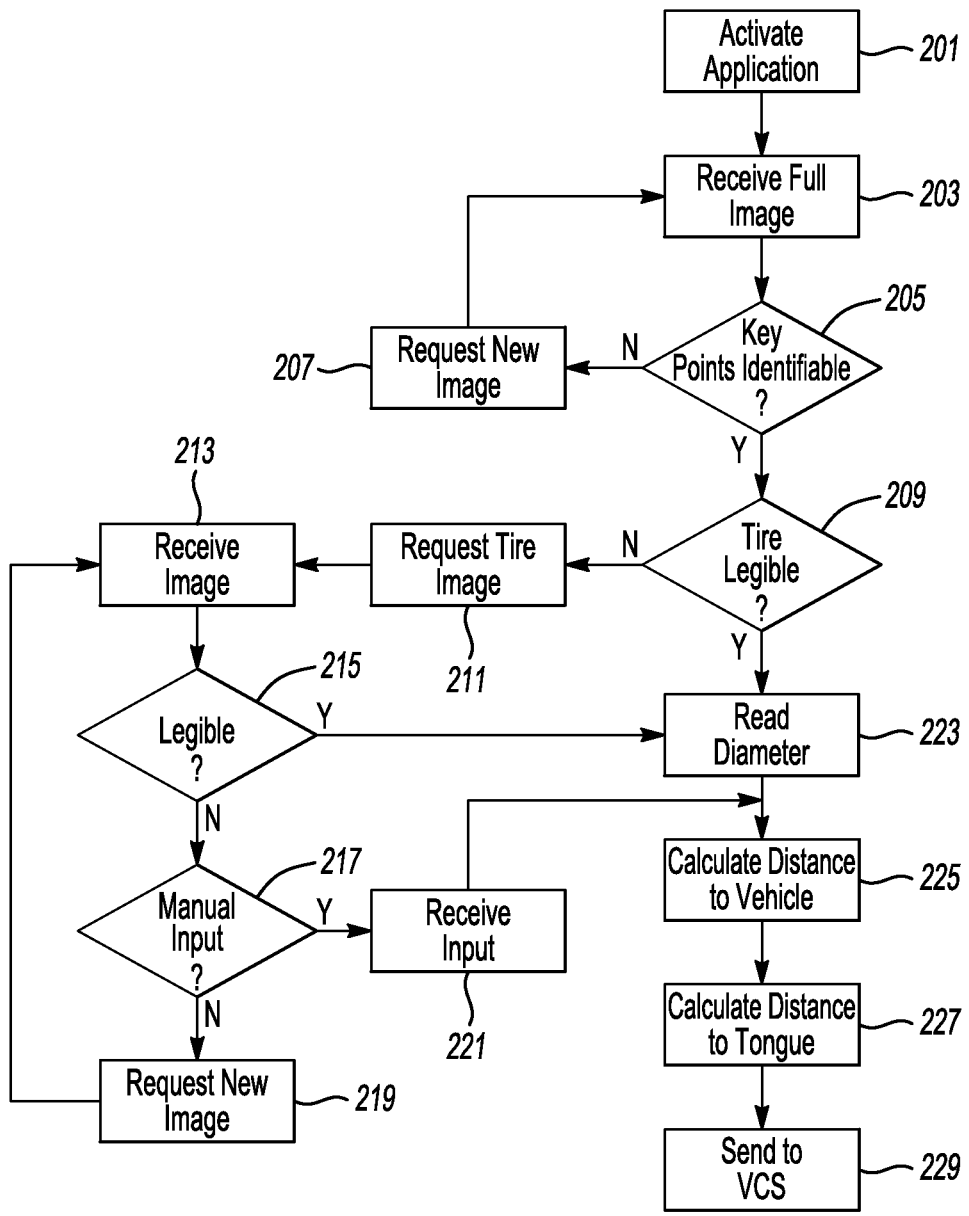
FIG. 2 shows an illustrative example of an image processing procedure.

FIG. 2 shows an illustrative example of an image processing procedure. In this illustrative embodiment, an application for use on a smart phone or other portable camera-equipped device has been provided to a vehicle user. The application provides the user with suitable instruction and access to the requisite functionalities of the device. The processing of the image itself could be done on a vehicle computing system, although in this example, the process will be described as being executed on the portable device.

Once the application has been launched 201, the user may be asked to take a picture of the full trailer, or at least including both the trailer axle and the tongue (i.e. attachable end). The process receives the full image 203 once the picture has been taken by the user. In this illustrative example, the image processor will attempt to identify the distance between a tongue and an axle, as this will be useful in providing enhanced trailer control while the vehilce is en-route. Accordingly, the process checks the image to determine if both a recognizable axle center and tongue end-point are present 205.

Due to bad lighting, poor picture quality, rust and discoloration, off-center imaging and other potential problems, the process may not be able to recognize an axle and an end-point. In this example, a new picture is provided 207 until the proper attributes are present. In other examples, it may not be possible to merely take the picture with suitable recognizability, and user assistance may be required to identify the attributes. Such user assistance is discussed in greater detail with respect to FIG. 3.

Additionally, the process uses the wheel diameter to determine other distances on the image. Since the user may not know the wheel diameter, an image of the tire exterior may be used to provide the needed information. In this illustrative example, the process attempts to read the markings on the tire exterior 209 in order to determine a wheel diameter.

If the image is unclear or illegible (which may be common, given the distance at which the first picture may be taken), the process requests a close up of the markings on the tire 211. An image is taken and received by the process 213, at which point the process determines if the markings are legible 215. If the markings are not legible, the process may ask if the user wishes to manually input the wheel diameter 217.

Since it is possible that the markings of the tire will have been worn off over time or otherwise degraded, it may be impossible to read the diameter regardless of the number of photographs. In such a case, it may be desirable to manually input a wheel diameter 221. Otherwise, if the markings are available, a new image may be taken and provided 219 that more clearly shows the markings for reading by the process 223.

The process can read the markings (on a legible tire) and determine the wheel diameter 223. Once the diameter is known, the process can examine the original image and recognize the distance between two oppositional radial points. The distance (i.e., diameter) as represented on the picture can be used as a scale to then measure a distance from the center of the axle to the tongue of the trailer 225, 227. This information can then be relayed to a vehicle computing system for later use in trailer control during travel.

Figure 3:
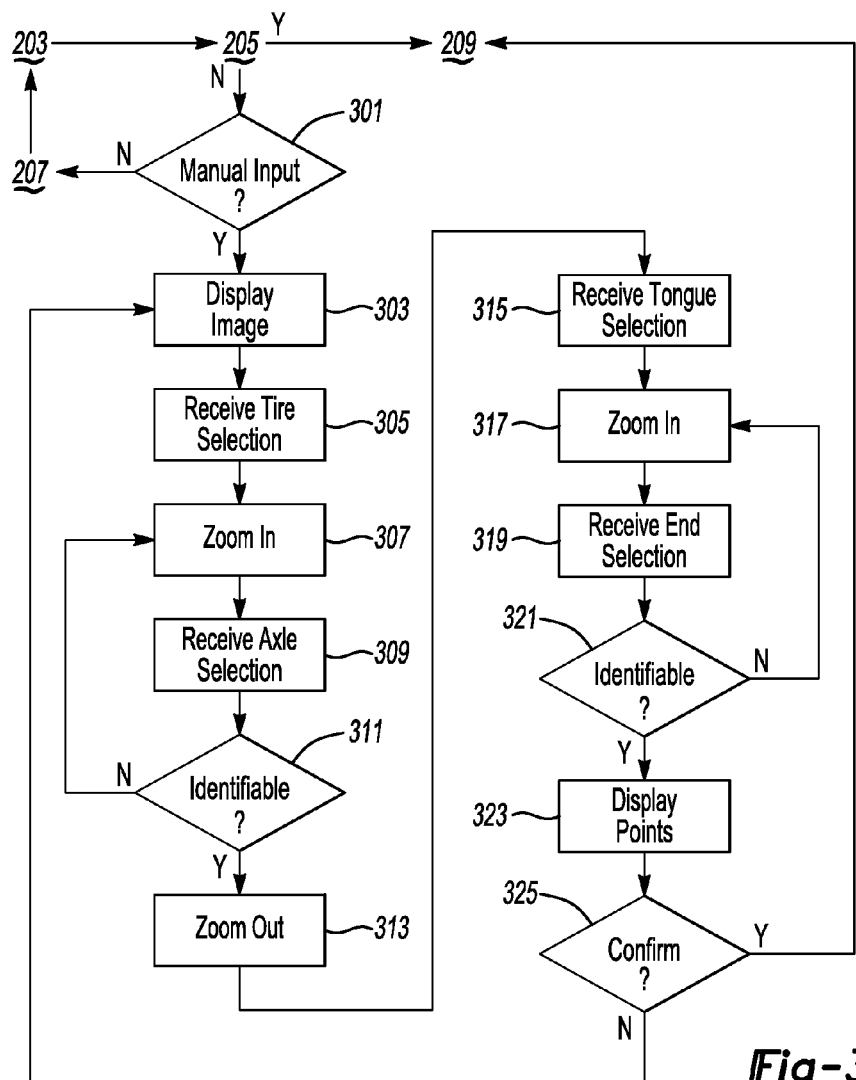
FIG. 3 shows an illustrative example of an image adjustment procedure.

FIG. 3 shows an illustrative example of an image adjustment procedure. In this illustrative example, a user will manually identify the axle center and tongue, as may be necessary if the process cannot automatically identify the points. The identification can be provided, for example, by touch-selecting the center of the axle (on a zoomed in point, for example) and also touch-selecting the end-point of the tongue.

If an image does not have identifiable points, the process may ask a user if they wish to manually identify the points 301. If manual input is desired, the process may display the first (full) image for the user 303. In this image, the user can select a tire, which can be used then for axle identification. The tire selection 305 will then be displayed in a zoomed fashion 307. If the axle is identifiable the axle can be selected on the picture 309. If the axle and/or selection is then identifiable from the selection 311, the process may zoom in further.

Once the axle has been selected, the process zooms out the picture 313 and the user selects a region containing the tongue 315. Again, the process may zoom in on the tongue 317, and then the user can select the "end" of the tongue, representing the point on the attachable end of the trailer furthest from the axle 319. If the end is clearly identifiable once selected 321, the process can then display the points on the image 323. The user can then confirm that the points accurately represent the proper portions of the image 325.

Figure 4A:
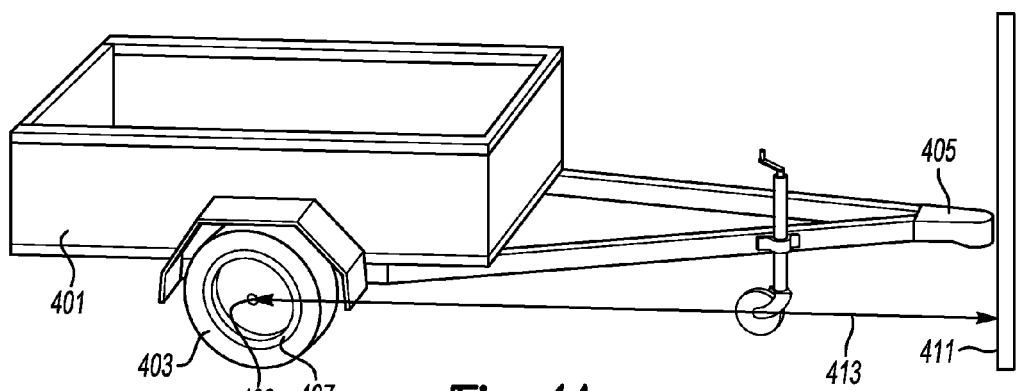
FIGS. 4A and 4B show illustrative examples of trailer part images.
Figure 4B:
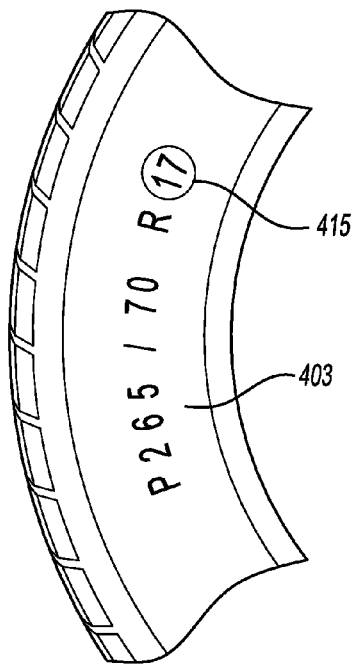

FIGS. 4A and 4B show illustrative examples of trailer part images. The image shown in FIG. 4A includes additional identifiers that correspond to the user selections or automatically identified points. The trailer 401 includes an image of a tire 403, having an axle 409 and a tongue 405.

In this example, the process identifies a wheel diameter 407 and can visually show the diameter so that the user can confirm the correct identification was applied, i.e., they don't want to accidentally select the tire diameter or other point. The process may also show a point representing the axle 409 and a marking representing the end-point of the trailer 411.

Using the represented distance shown by the diameter of the wheel, any other distance between two points in the image can be estimated. The process can thus estimate the points between the center of the axle and the end of the trailer tongue 413.

In FIG. 4B, a close-up of a tire 403 is shown. On the side of the tire, markings are provided that can be used to determine wheel size. In this example, the last two digits of the marking 415 identify the wheel size.

Figure 5:
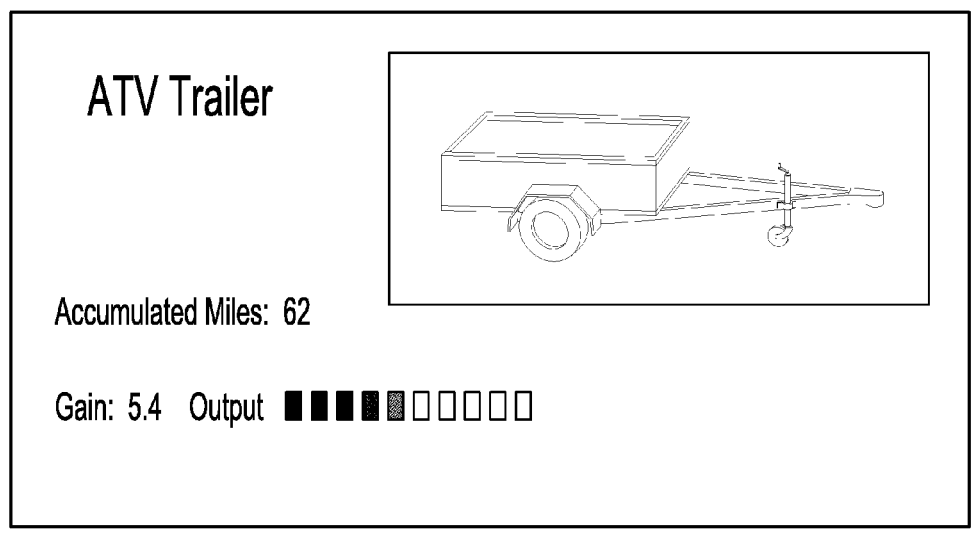
FIG. 5 shows an illustrative example of a display for an attached trailer.

FIG. 5 shows an illustrative example of a display for an attached trailer. In this image, which can be shown on a vehicle display and/or a mobile device, information relating to a number of travel features and trailer identifiers may be shown. In this example, the display 501 includes a picture of the trailer 505. This can help a user identify a particular trailer if more than one is saved.

Also, a name/identifier may be designated for the save trailer 505. The system can also track accumulated miles 507, as well as providing other vehicle-related data such as gain 509 and current power output 511. Other suitable features may also be provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a trailer image;
automatically identify an axle and a tongue-end in the trailer image;
receive a tire image;
retrieve a wheel diameter marked on a tire in the tire image;
automatically identify a diameter of a wheel corresponding to the axle in the trailer image;
determine a scale between the wheel diameter and the diameter; and
calculate a distance from the axle to the tongue-end using the scale.

2. The system of claim 1, wherein the processor is provided as part of a cellular phone.

3. The system of claim 1, wherein the processor is provided as part of a vehicle computing system.

4. The system of claim 1, wherein the processor is further configured to provide the calculated distance to a trailering control program.

5. The system of claim 1, wherein, the processor is further configured to:
determine that a wheel diameter cannot be retrieved from the tire image; and
request and receive input of a wheel diameter, if the wheel diameter cannot be retrieved from the tire image.

6. A computer-implemented method comprising:
receiving a trailer image;
automatically identifying an axle and a tongue-end in the trailer image;
receiving a tire image;
retrieving a wheel diameter marked on a tire from the tire image;
automatically identifying a diameter of a wheel corresponding to the axle in the trailer image;
determining a scale between the marked wheel diameter and the identified diameter; and
calculating a distance between the axle and the tongue-end using the scale.

7. The method of claim 6, wherein the diameter is identified between two oppositional radial points of the wheel in the tire image.

8. The method of claim 6, wherein the axle includes the wheel from the trailer image, and wherein the wheel includes the tire of the tire image.

9. The method of claim 6, wherein the trailer image includes the tire image.

10. The method of claim 6, wherein, further comprising:
determining that a wheel diameter cannot be retrieved from the tire image; and
requesting and receiving input of a wheel diameter, if the wheel diameter cannot be retrieved from the tire image.

11. A non-transitory computer-readable storage medium, storing instructions that, when executed by a processor, cause the processor to perform a method comprising:
receiving a trailer image;
automatically identifying an axle and a tongue-end in the trailer image;
receiving a tire image;
retrieving a marked wheel diameter on a tire from the tire image;
automatically identifying a diameter of a wheel corresponding to the axle in the trailer image;
determining a scale between the marked wheel diameter and the diameter; and
calculating a distance from the axle to the tongue-end using the scale.

12. The non-transitory computer-readable storage medium of claim 11, wherein the processor is provided as part of a cellular phone.

13. The non-transitory computer-readable storage medium of claim 11, wherein the processor is provided as part of a vehicle computing system.

14. The non-transitory computer-readable storage medium of claim 11, wherein, further comprising:
determining that a wheel diameter cannot be retrieved from the tire image; and
requesting and receiving input of a wheel diameter, if the wheel diameter cannot be retrieved from the tire image.

* * * * *